United States Patent [19]

Fread

[11] 4,133,996
[45] Jan. 9, 1979

[54] MICROWAVE OVEN EGG COOKING APPARATUS

[76] Inventor: Ronald G. Fread, 10 Davenport Ave., New Rochelle, N.Y. 10805

[21] Appl. No.: 768,856

[22] Filed: Feb. 15, 1977

[51] Int. Cl.² .............................................. H05B 9/06
[52] U.S. Cl. ...................... 219/10.55 M; 219/10.55 E; 426/243
[58] Field of Search ................. 219/10.55 E, 10.55 M; 73/427; 99/DIG. 14; 426/231, 241–244

[56] References Cited

U.S. PATENT DOCUMENTS

| | | | |
|---|---|---|---|
| 2,097,073 | 10/1937 | Long | 219/10.55 E |
| 2,600,566 | 6/1972 | Moffett, Jr. | 219/10.55 E |
| 2,714,070 | 7/1955 | Welch | 219/10.55 E |
| 3,490,290 | 1/1970 | Bilson | 73/427 |
| 3,547,661 | 12/1970 | Stevenson | 219/10.55 E |
| 3,615,713 | 10/1971 | Stevenson | 219/10.55 E |
| 4,013,798 | 3/1977 | Goltsos | 219/10.55 E |

*Primary Examiner*—J. V. Truhe
*Assistant Examiner*—Bernard Roskoski

[57] ABSTRACT

An apparatus for enabling the cooking of a raw shelled egg in a microwave oven of the type that is energizable for a selectable predetermined time period. The apparatus comprises an open top container for receiving the raw egg, a ventilated cover closely fittable over the open top of the container and a first and a second shield disposed above and below the received egg respectively. The shields serve to distribute the available microwave energy to effect the cooking of both the yolk and albumin portions of the received egg to a desired degree of doneness in the selected predetermined time period.

4 Claims, 3 Drawing Figures

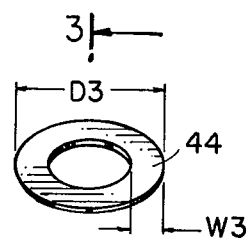
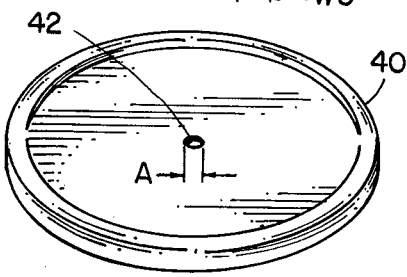
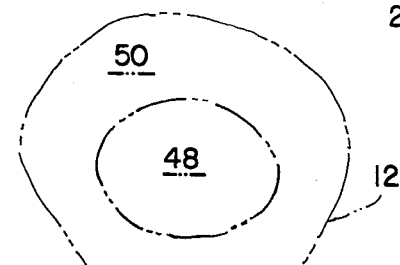
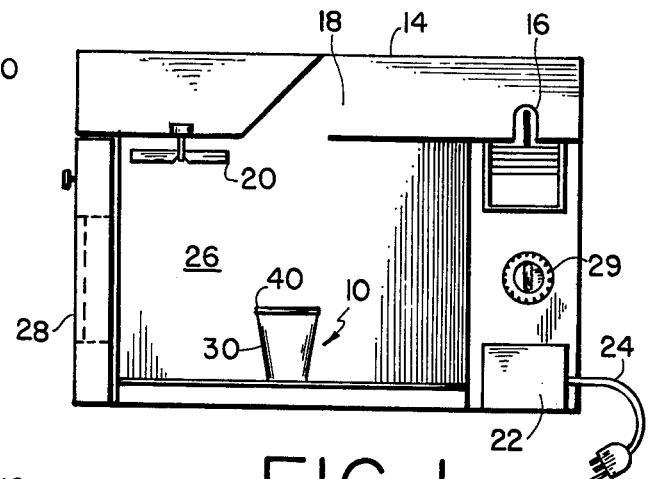
FIG. 1
FIG. 2
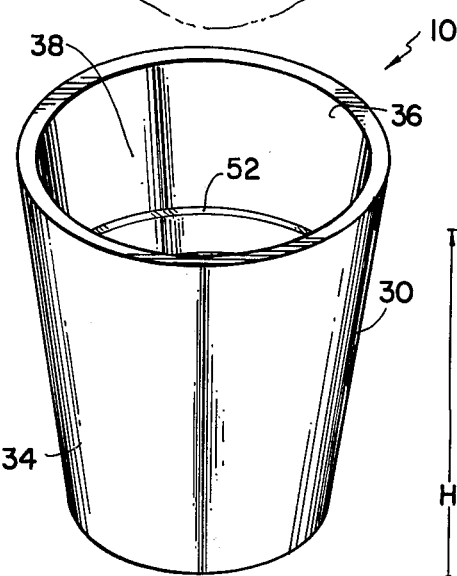
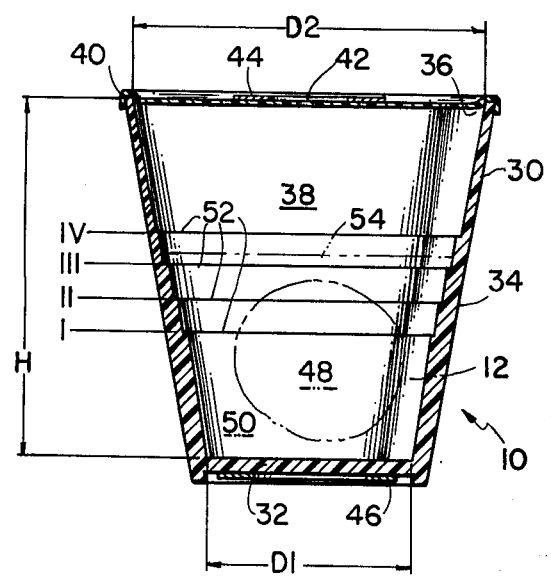
FIG. 3

MICROWAVE OVEN EGG COOKING APPARATUS

BACKGROUND OF THE INVENTION

The present invention relates to apparatuses for cooking eggs in a microwave oven.

Techniques of microwave cookery are well known in the prior art, but there is no apparatus previously known that would effect the soft cooking of eggs by energizing the egg molecules in a microwave electric field without utilizing water or other microwave energy absorbing material and thusly take full advantage of the speed and efficiency of microwave cooking technology.

Of the many types of food purveying establishments, all could make use of a means for soft cooking eggs quickly. This is particularly true for hospitals, nursing homes and other such similar institutions where this may be the only form of cooked egg that their patients are permitted to eat. It is apparent that a simple method of preparing a soft cooked egg from the raw state by cooking it in a microwave oven for less then one-tenth the time required by conventional cooking methods would be most desirable. The preparation of soft cooked eggs by conventional methods of boiling or steaming normally takes from 3 to 4 minutes, after which time the hot egg shell must be cracked and the egg scooped out of the shell.

It has been very difficult to cook unbeaten eggs using microwaves because of the dissimilarity of the energy absorbing characteristics between the yolk and albumin portions. The measure of the heat energy absorbing characteristics of any material is its specific heat which can be defined as the quantity of heat energy required to raise the temperature of a unit mass by a single temperature degree. Egg yolks have a specific heat of 0.67 Btu/lb/° F. while the albumin or egg whites have a specific heat of 0.92 Btu/lb/° F. These data reveal that a given amount of egg yolk would absorb more energy and increase in temperature approximately 40% faster than the same weight of egg white when both are subjected to the same amount of heat energy and normally the yolk would cook faster. Although the boiling process also causes the yolk and albumin to absorb heat at a rate dependent upon their specific heats, in this process the heat is transferred mostly by conduction. In conductive heat transfer, heat flows from a hotter area to a colder one with which it is in contact and so, the outer surface of the material being heated is necessarily at a higher temperature than the inner portions. Because the albumin which has the higher specific heat surrounds the yolk, an egg will cook uniformly when boiled in the shell. Although less energy reaches the yolk by conduction, less energy is required for cooking it because of its lower specific heat. Cooking time by conduction is dependent upon the temerature difference between the product to be cooked and the surrounding medium.

Microwave heating differs from conventional forms of heat transfer in that microwaves cause both the surface and interior portions of the food to be heated directly and simultaneously without the need to heat the surrounding environment. The microwaves are present everywhere in the energized microwave oven and thus penetrate microwave absorbing food from all sides. In the presence of a microwave field, the food molecules are excited and oscillate in the continuously alternating field and are caused to rub against one another. This rubbing action generates heat within each molecule due to friction therebetween. The molecular activity continues after the microwave field is removed and heating and therefor cooking continues for a period of time. This phenomenon explains the difficulty in soft cooking whole eggs. The normal energy distribution would either cause the yolk to be cooked before the albumin had set or solidified and the egg would be partially undercooked or, if the egg is kept in the microwave field for a time long enough to cook the albumin, the yolk would overcook and possibly burst.

Reference is made to a publication distributed by Litton Systems, Inc., a major manufacturer of microwave ovens and components. In their handbook "Litton Microwave Ovens — Hospital Patient Feeding Systems" it is noted that an egg yolk which comprises fat in a colloidal state, is a bad dielectric (or a good microwave absorber) and will heat up more quickly than the egg white which comprises protein. The reference goes on to say that this is one reason eggs are difficult to cook in their whole state in a microwave oven. The same reference recommends that eggs be scrambled for cooking in order to make a homogeneous mixture. A recipe given for cooking soft boiled eggs in a microwave oven specifies placing the egg in water that is first boiled in the oven and then cooking the egg by immersing it in the boiling water.

Neither this, nor any other commonly known method for soft cooking eggs, discloses an apparatus for use in a microwave oven for completely cooking a raw egg quickly and without the addition of a surrounding heat absorbing fluid such as water or milk. Furthermore, neither teaches an apparatus where it is not necessary to use room temperature eggs or to pierce the yolk membrane to prevent bursting, procedures which are recommended in some cookbook recipes for microwave cooked poached eggs.

SUMMARY OF THE INVENTION

It is the principle object of this invention to provide an apparatus for soft cooking a raw shelled egg in a microwave oven in less time than by conventional methods.

A further object is to provide a soft cooked egg identical in taste and consistency to an egg boiled in the shell.

A still further object is to provide an apparatus that is low cost and disposable and in which the cooked egg may be served.

These and other objects are achieved by the preferred embodiment of the present invention in which an apparatus that enables the cooking of a raw shelled egg in a microwave oven is provided. The apparatus comprises a coverable container made of microwave transmissible material for receiving the raw egg therein. The cover also comprises microwave transmissible material and has a ventilating aperture therethrough. A pair of shields comprising microwave reflecting material are disposed on opposite sides of the received egg to reflect a portion of the available microwave energy that would normally penetrate the egg to allow uniform cooking of the egg. The apparatus cooks the received egg to a desired degree of doneness in a selected predetermined time period.

Having in mind the above and other objects that would be obvious from an understanding of the disclosure, the present invention comprises a combination and arrangement of parts illustrated in the presently preferred embodiments of the invention which are hereinafter set forth in sufficient detail to enable those persons skilled in the art to clearly understand the function, operation, construction and advantages of it when read in conjunction with the accompanying drawing.

BRIEF DESCRIPTION OF THE DRAWING

The invention will be described in detail by way of example, with reference to the following drawing in which:

FIG. 1 is a front elevational view of the apparatus shown in a microwave oven;

FIG. 2 is an expanded view of the preferred embodiment; and

FIG. 3 is a sectional view taken along line 3—3 in FIG. 2.

DETAILED DESCRIPTION OF THE INVENTION

Referring to FIGS. 1-3 of the drawing and in accordance with the principles of the invention, an apparatus 10 for cooking a shelled raw egg 12 in a microwave oven 14 is shown. The oven 14 is of the type that is energizable for a selected predetermined time period such as by a manually settable timer and basically comprises a magnetron 16, a wave guide 18, a mode stirrer 20, a power supply 22, a line cord 24, a cooking cavity 26, a door 28 and a timer switch 29.

As shown in FIGS. 2 and 3, the apparatus 10 consists of a container 30 having a substantially circular and planar base portion 32, frusto-conically shaped walls 34 diverging from the base 32 to an open circular top portion 36. The base portion 32 has a first inside diameter D1 while the open top portion 36 has an inside diameter D2 that is larger than diameter D1. The container 30 has sufficient volume 38 to receive a shelled raw egg 12 therein. Food geometry is very important in microwave cooking and must be considered since regular shapes heat more uniformly in microwave ovens. Where the shape is irregular, the thinner, narrower parts tend to heat more quickly and can easily overcook. The container 30 is proportioned to retain the egg 12 in a regular volume configuration wherein the height is preferably approximately equal to 20% to 60% of the average diameter to obtain uniform cooking.

The apparatus 10 further includes a cover 40 that is closely receivable over the open top portion 36. The cover 40 has a ventilating aperture or hole 42 therethrough. Both the container 30 and the cover 40 are made of microwave transmissible material. Microwave transmissible materials include plastic, paper, glass and china among others. The container 30 and cover 40 can be made of a permanent and reusable material for home use such as china, but for a low cost and disposable apparatus the preferred material is plastic. The container 30 would be molded of an expandable polystyrene foam such as Dow Corning Company's Styrofoam and the cover 40 would be formed of polystyrene.

A first shield 44 and a second shield 46 are oppositely disposed around the received egg 12 and in proximity thereto for distributing the available microwave energy from the microwave oven 14 to the yolk 48 and albumin portions 50 of the raw egg 12 to effect the cooking of these portions to the desired degree of doneness in a selected predetermined time period. The preferable position of the shields 44, 46 is obtained when one is disposed above the received egg 12 and the other disposed below the egg. The shields 44, 46 must be made of microwave reflectible material such as metal and preferably of aluminum foil formed in an annulus or washer shape. This geometry is one configuration of the shields 44, 46 that would serve to reflect a portion of microwave energy and allow uniform cooking of the received egg 12. By use of these shields 44, 46 the albumin portion 50 and the yolk portion 48 each absorb sufficient energy to increase their temperatures to effect the desired degree of cooking of each in substantially the same time period. The diameter of the shields 44, 46 are proportioned to the container 30. The first or top shield 44 has an outside diameter D3 which is smaller than the base diameter D1, and the second or bottom shield 46 has an outside diameter D4 which is larger than the diameter D3 of the top shield 44 and smaller than the base diameter D1. The top and bottom shields 44, 46 are affixed to the outer surfaces of the cover 40 and the base portion 32, respectively, and aligned substantially concentric thereto, thereby positioning the shields 44, 46 in concentric alignment with each other about the vertical axis of the container 30 and cover 40. Alternatively, these shields 44, 46 may be printed or screened to the cover 40 and base 32 in the alignment previously described using a metallic based ink that would also be microwave reflective.

The cooking time of an egg is proportional to its weight. This weight can be measured with a conventional scale or alternatively can be determined by measuring the volume of the shelled egg which is closely proportional to the weight. This volume is readily determined by having indicia disposed on the sides of the container 30. The indicia may be in the form of scribed or printed markings on the container walls 34 but preferably it is in the form of stepped annular rings 52 molded inside the container 30 as shown in FIG. 3. A calibrated dip stick, not shown, can also be used to determine the volume of the raw egg 12.

In use, a raw egg 12 at normal refrigerator temperature (approximately 4° C.) is cracked and deposited into the container 30 which has the bottom shield 46 afficed to the underside of its base portion 32. The volume of the received egg 12 is measured by reading the meniscus 54 at the egg's surface with respect to indicia 52. These indicia can be marked to indicate the volume directly or by a reference symbol. The volume increase at each step is approximately 10 milliliters. It is at this volume interval that a change in cooking time must be effected. The optimum cooking time in the oven 14 is then determined by referring to a conversion table or the like that equates the measured volume to the time to be selected by the timer switch 29. The container 30 is then closed with the ventilated cover 40 which has the top shield 44 affixed to the outside surface, and the apparatus 10 is placed in the center of the cavity 26 of the microwave oven 14 and the timer switch 29 set in accordance with the egg volume. The microwave field is established until the timer switch opens at the completion of the predetermined time period.

The cooking continues for a period of time after the oven 14 is turned off. This secondary cooking has been anticipated when the conversion of egg volume to cooking time was established. The ventilating aperture 42 in the cover 40 allows steam and heated air to escape slowly until the pressure within the closed container 30 equalizes with the outside pressure. The size of the aperture 42 regulates the secondary cooking time. When this secondary cooking is completed, the egg 12 has a firm but unhardened yolk 48 and a fully set albumin portion 50. The apparatus 10 can be transported to the diner while the secondary cooking takes place so that the secondary cooking time and the transporting time are concurrent. The egg 12 may be served in the container 30 and, because of the heat insulating properties of Styrofoam, it will retain the heat within the closed container 30 for some period of time. It is no longer necessary to shell the hot egg after cooking as in conventional boiling methods since the egg was removed from its shell prior to cooking.

EXAMPLE

Experimental data from test using a Litton Model 70/50 microwave oven rated at 1.3 kilowatts are tabulated below:

| Container: Styrofoam | $D_1$ = 5.0 cm. |
| --- | --- |
| | $D_2$ = 6.4 cm. |
| | $H$ = 4.6 cm. |
| Cover: polystyrene | $A$ = 1.5 mm. |
| Shields: aluminum foil | $D_3$ = 2.5 cm. |
| | $D_4$ = 3.0 cm. |
| | $W_3$ = 0.6 cm. |
| | $W_4$ = 0.6 cm. |

| Indicia | Max. Volume | Max. Cooking Time in Oven |
| --- | --- | --- |
| I | 28 ml. | 14 seconds |
| II | 38 ml. | 15 seconds |
| III | 48 ml. | 16 seconds |
| IV | 58 ml. | 17 seconds |

The cooking time for individual eggs is determined by sighting the first indicia step above the meniscus and reading the corresponding cooking time in the above table. After this cooking time, the cover was left in place for at least 3 minutes. All eggs are initially at normal refrigerator temperature. It is understood that this table is derived from a particular model of microwave oven. Other ovens must be tested to determine any deviation in cooking times.

While preferred and other exemplary embodiments of the invention are illustrated and/or described, it will be understood that the invention is in no way limited to these embodiments.

What is claimed is:

1. A method for cooking a raw shelled egg in a microwave oven of the type that is energizable for selectable time periods, said method comprising the steps of:
   a. providing a container having a base portion and a substantially concentric open top portion and comprising microwave transmissible material;
   b. depositing a raw shelled egg in the container;
   c. closing the container with a ventilated cover of microwave transmissible material, received over said open top portion to confine the egg therein;
   d. placing the container in a microwave oven which is energized for a selected time period and distributing the available microwave energy from the energized oven to the yolk and albumin portions of the egg to effect the cooking of both portions to a desired degree of doneness in the selected time period by providing microwave reflective material solely above and beneath the egg by a first shield disposed over the egg and adjacent to the cover and a second shield disposed below the egg and adjacent to said base portion of the container.

2. The method as recited in claim 1, further including the step of measuring the volume of the raw shelled egg when received in the container to determine the selected time period.

3. The method as recited in claim 2, wherein the step of measuring includes providing indicia on the inner wall surface of the container to effect measurement.

4. The method as recited in claim 1, wherein the step of providing microwave reflective material includes providing annular first and second shields substantially concentric to said cover and to said base portion of the container respectively and positioning the shields in concentric alignment when said cover is received over said top portion of the container.

* * * * *